United States Patent [19]

Severinsky

[11] Patent Number: 4,685,042
[45] Date of Patent: Aug. 4, 1987

[54] MODULATOR CONTROL FOR INVERTER

[75] Inventor: Alexander J. Severinsky, Dallas, Tex.

[73] Assignee: Unitron, Inc., Garland, Tex.

[21] Appl. No.: 627,721

[22] Filed: Jul. 3, 1984

[51] Int. Cl.$^4$ ............................................ H02M 1/12
[52] U.S. Cl. ...................................... 363/41; 363/37; 363/97
[58] Field of Search ...................... 363/34, 37, 40, 41, 363/45, 47, 46, 97

[56] References Cited

U.S. PATENT DOCUMENTS

| | | | |
|---|---|---|---|
| 3,746,963 | 7/1973 | VeNard | 363/47 |
| 4,246,633 | 1/1981 | Borkovitz | 363/47 |
| 4,386,394 | 5/1983 | Kocher et al. | 363/41 |
| 4,409,535 | 10/1983 | Hickman | 363/41 |
| 4,472,672 | 9/1984 | Pacholok | 363/41 |
| 4,520,437 | 5/1985 | Borttcher et al. | 363/41 |
| 4,521,840 | 6/1985 | Hoadley | 363/37 |

*Primary Examiner*—Patrick R. Salce
*Assistant Examiner*—Jeffrey Starratt
*Attorney, Agent, or Firm*—Kenneth R. Glaser

[57] ABSTRACT

An inverter circuit for a power train has a rectifier for rectifying a three phase AC input and a filter comprising an inductor and capacitor to produce a filtered DC signal for application to the inverter. A high to low voltage transducer receives the filtered DC signal to produce a low voltage output representation thereof. A leading phase shifter shifts the low voltage signal in phase. A sample and hold amplifier receives shifted signal, and a pulse generator generates timing pulses applied to the sample and volt amplifier, whereby the sample and hold amplifier produces an output signal amplitude corresponding to the amplitude of the shifted signal during periods indicated by the pulse generator output. A triangle wave generator provides a triangle wave output to a pulse width modulator, which also receives the output from the sample and hold amplifier to produce an output pulse indicative of the signal level of the filtered DC output. Finally, a decoder receives the width modulated pulses, and an inverter switching circuit receives the decoded pulse width signals to produce a three phase output having reduced modulation.

2 Claims, 3 Drawing Figures

MODULATOR CONTROL FOR INVERTER

BACKGROUND OF THE INVENTION

1. FIELD OF THE INVENTION

This invention relates to improvements in power circuits, and, more particularly, to improvements in inverter circuits, and still more particularly to an inverter circuit having modulating control to produce distortion and modulation free output.

2. DESCRIPTION OF THE PRIOR ART

In the field of power circuits, inverters are frequently employed to deliver AC signals from a DC input. Sometimes in certain power train applications, it is found to be most efficient in some applications to produce an AC output at a different level and/or frequency from an AC input by first rectifying the AC input, then applying the rectified voltage to an inverter to produce an AC output at the desired voltage level. Often times, however, when such rectifying and inverting techniques are used, inverters typically employed produce a great deal of amplitude modulation distortion in their outputs, especially when the rectified voltage is lightly filtered.

As an example, in certain aircraft and military applications, a power requirement is frquently encountered in which an AC voltage of 400 cycles is needed. In the past, this has been accomplished by first rectifying a standard 60 cycle power voltage and then filtering the resulting rectified DC voltage. Thereafter the rectified and filtered DC voltage is applied to an inverter which operates to produce a 400 cycle signal at the desired voltage. Not uncommonly, however, very large filter capacitors are required to remove the unwanted harmonics and modulation components from the rectified signal, filter capacitors on the order of 10,000–20,000 microfarads per 40 KW of output power typically being required for this purpose. More particularly modulation subharmonics which are produced are, as is well known in the art, a sum of multiples and submultiples of the fundamental frequency and the modulation frequencies, each modulation subharmonic being at a particular amplitude. The filter, used in the past to remove these modulation products, has therefore been primarily directed at reducing the respective amplitudes of these modulation products. Furthermore in many frequently encountered applications, two three phase inputs are applied to a power train of the type described to produce a three phase output of desired voltage and frequency with one of the three phase inputs typically being thirty degrees out of phase with the other to permit ease of processing using standard, well known techniques.

What is needed is a technique for producing an inverter output with reduced, or preferably no amplitude modulation, especially under load conditions, and which has a significantly reduced requirement for large filter capacitors, and which can, if desired, be used in conjunction with available plural three phase inputs of known phase difference.

SUMMARY OF THE INVENTION

In light of the above, it is, therefore, an object of the invention to provide an improved inverter control which produces an output from the inverter having lower amplitude modulation than prior inverter circuits.

It is another object of the invention to provide an inverter control of the type described which includes a modulator circuit which derives its input from the DC input to the inverter and produces a modulation signal which cancels amplitude modulation in the inverter output.

It is another object of the invention to provide an inverter control of the type described which employs low level logic circuitry to accomplish cancellation of modulation signals.

It is another object of the invention to provide a power train circuit in which the size requirements for filter capacitors used in the power train are significantly reduced from those heretofore required.

It is another object of the invention to provide a power train circuit of the type described which is compatible with existing signal inputs, including plural three phase inputs of known phase difference.

It is another object of the invention to provide a power train circuit of the type described which converts a first power signal at a known voltage and frequency to a desired different voltage and/or frequency.

It is yet another object of the invention to provide a power train and inverter circuit of the type described in which modulation products produced during rectification segments of the inverting process are cancelled, rather than merely reduced in amplitude by filtering techniques.

These and other objects, features, and advantages, will become apparent to those skilled in the art from the following detailed description when read in conjunction with the accompanying drawings and appended claims.

It its broad aspect, the invention presents an improved inverter control for producing an AC output from the inverter having minimum distortion and harmonic content. The inverter can be used in a power train following a rectifier and filter combination which furnishes the DC input to the inverter and which has a significantly reduced filter capacitances. The inverter control includes means for demodulating the DC input signal to develop a correction signal, and means controlled by the correction signal for digitally modulating the inverter to produce the desired output waveforms by cancelling the unwanted modulation products formed during rectification of the power train input signal.

BRIEF DESCRIPTION OF THE DRAWING

The invention is illustrated in the accompanying drawings, in which.

In the various figures of the drawing, like reference numerals are used to denote like or similar parts.

DETAILED DESCRIPTION OF THE PREFERRED EMBODIMENTS

Figure 1:
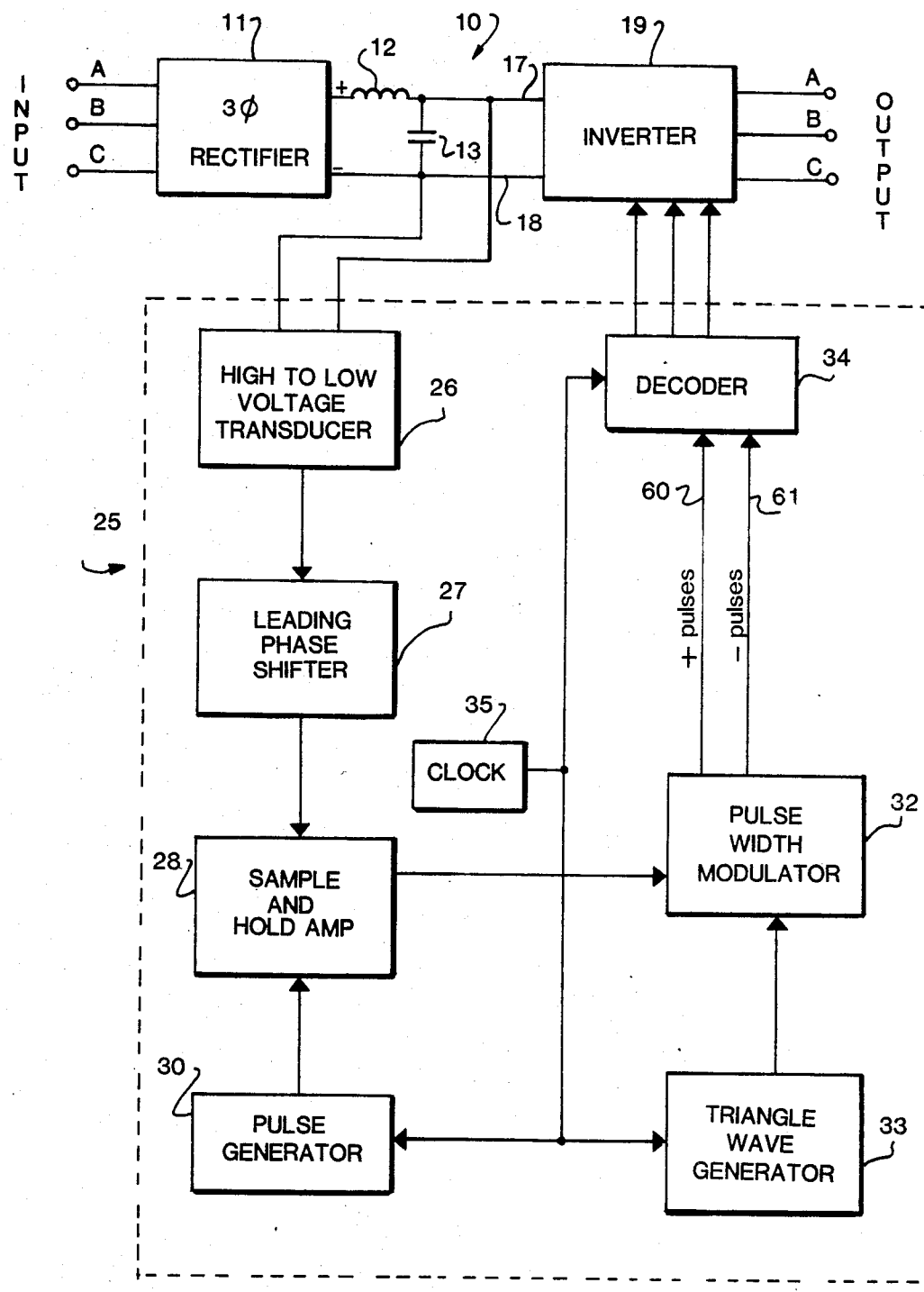
FIG. 1 is a block diagram of a power conversion network including an inverter, along with a modulator control of the present invention.

A power converter circuit, in which an inverter 19 is modulated in accordance with the invention, is shown in FIG. 1, and is denoted generally by the reference numeral 10. The circuit 10 includes a standard power train, including a three phase rectifier 11, to which input lines A, B, and C are applied. It should be noted that although the invention is described herein with particular application to a three phase system, it will be understood that the principles of this invention are equally applicable to single phase conversion as well as applications utilizing plural, including multiphase, inputs of known phase difference. The DC output of the rectifier 11 is filtered by a filter including an inductor 12 in series with the DC output and a capacitor 13 in parallel therewith to provide a filtered DC signal on the lines 17 and 18. The filter, including the inductor 12 and capacitor 13, can be constructed in the same or similar manner as those of the prior art, except that the requirements for the capacitor 13 are significantly reduced. For example, capacitors of very small values can be advantageously employed, as will become apparent to those skilled in the art. The DC lines 17 and 18 serve as the input to an inverter 19, which produces a three phase AC output on respective lines A, B, and C. The details of the inverter 19 are described below with reference to FIG. 3.

As is well known, with no load on the inverter 19, the output lines A, B, and C is relatively pure and free of distortion and harmonics. However, when a load is placed on the inverter output, amplitude modulation undesirably appears. To eliminate or reduce its content, a modulator circuit 25 is provided in accordance with the invention. The modulator circuit 25 samples the input signal to the inverter 19 from lines 17 and 18, and, by way of voltage transducer 26, converts the high voltage filtered DC signal on lines 17 and 18 to a lower level voltage level, which can thereafter be used in logic circuitry to be described.

The output from the high to low voltage transducer 26 is applied to a leading phase shifter 27, which produces a positive phase shift of one-half clock pulse (the clock pulses are of six times the desired output frequency, the timing being discussed below in detail). The output of the leading phase shifter 27 is then applied, together with the output from a monostable multivibrator or short pulse generator 30 to a sample and hold amplifier 28. The output of the sample and hold amplifier 28 is delivered to one input of a pulse width modulator 32, with the other input of the pulse width modulator receiving a signal from a triangle wave generator 33. The output from the pulse width modulator 32 is applied to a decoder 34, and the output from the decoder 34 provides digital modulator drive waveforms to the inverter 19, in the manner described below with reference to FIGS. 2 and 3, to produce an output relatively free of amplitude modulation. The output from the pulse width modulator 32 is shown on two lines 60 and 61, for producing positive and negative decoder inputs respectively, for reasons which will become apparent below in the description of the decoder circuit. The clock 35 provides clock signals for pulses to the decoder 34, the triangle wave generator 33, and the short pulse generator 30.

Figure 2:
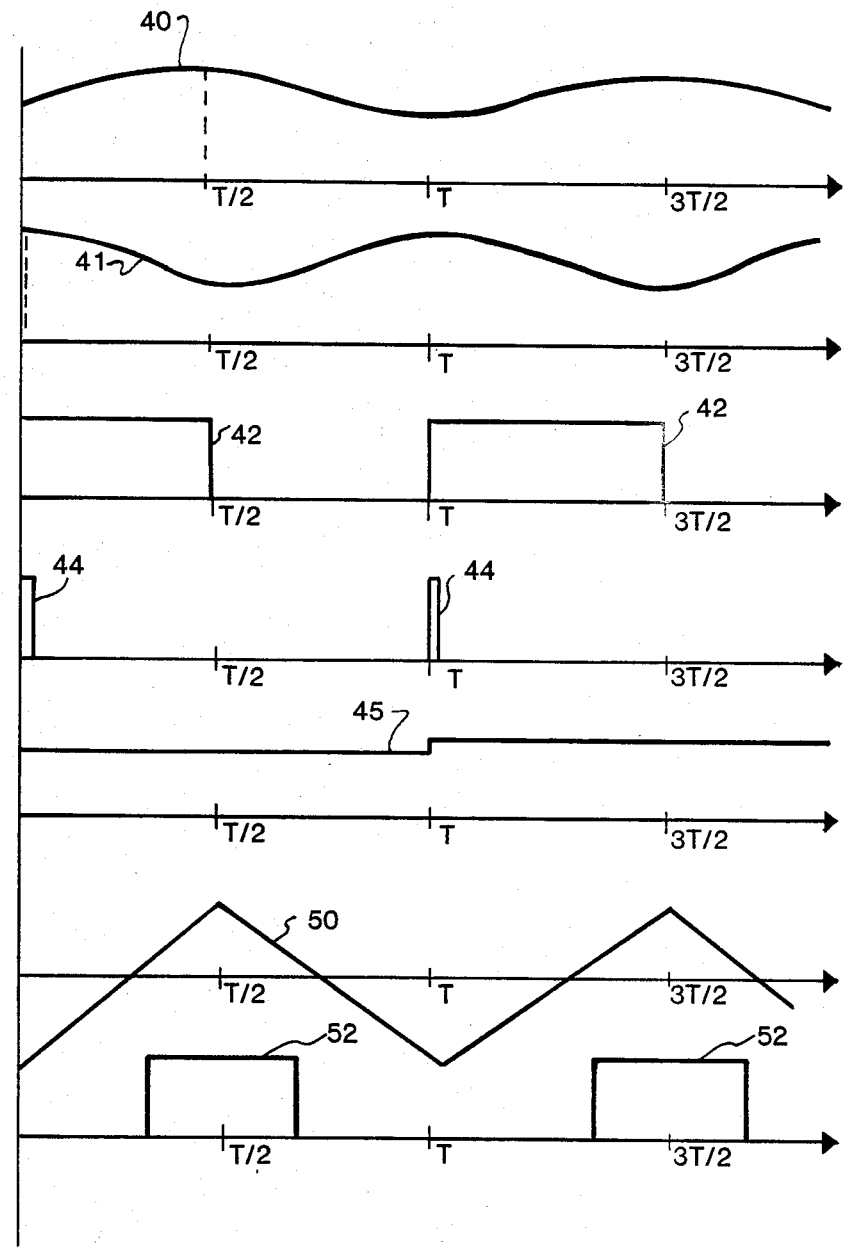
FIG. 2 is a plot of amplitude versus time, showing, on the same scale, the waveforms produced at various points in the circuit of FIG. 1.

The operation of the modulator circuit 25 is described with reference now to FIG. 2. As shown, the high to low voltage transducer 26 produces an output having a sinusoidal waveform 40 shown in exaggerated form. The sinusoidal shape represents the harmonics produced, especially with the inverter under load. The general formula for the output voltage from the filter is:

$$Vin = V_{DC} + \Sigma A_i \sin w_i t \tag{I}$$

where:
Vin is the AC voltage input;
$V_{DC}$ is the DC component of the rectifier;
$A_i$ is an amplitude scaler applied to each respective harmonic, $w_i$ is the frequency of the harmonic input signals, and t is time.

The waveform 40 is shifted one-half clock pulse forward by the leading phase shifter 27, to produce the waveform 41. Thus, the shifted waveform representing the harmonic distortion on the DC input to the inverter is produced and applied to the sample and hold amplifier 28.

The clock pulse waveform produced by the clock 35 and applied to the decoder 34, triangle wave generator 33, and short pulse generator 30, is represented by the waveform 42, and consists of a series of pulses having a state change each one-half clock pulse period; that is, each clock pulse is of width of one-half the period of the clock. (The period of the clock pulses is denoted in all of the timing diagrams of FIG. 2 by the letter "T".) Thus, the clock pulses 42 are applied to the short pulse generator 30, which may, in a preferred embodiment, be a monostable multivibrator to produce output pulses 44 of relatively short duration or width for application to the sample and hold amplifier 28. The sample and hold amplifier operates to take its sample with the occurrence of each rising edge of the pulses delivered by the short pulse generator 30 to produce at its output a waveform having the shape or configuration of the waveform 45.

The clock pulses 42 are also applied to a triangle wave generator 33 to produce a triangle wave 50 which changes direction with each clock pulse transition, each one-half clock period. The triangle waveform 50 is applied to the pulse width modulator 32, which in a preferred embodiment may merely be a comparator which produces an output when the magnitude of the triangle wave generator exceeds the voltage level provided by the sample and hold amplifier 28. Thus, the output of the pulse width modulator 32 is a train of pulses 52 having width determined by the magnitude of the voltage output of the sample and hold amplifier 28. It can be seen that the width of the pulses 52 produced by the pulse width modulator 32 is directly related to the magnitude of the signal at the output of the filter on lines 17 and 18. Moreover, the width of each pulse 52, being produced concurrently with the clock pulses 42, may vary from pulse to pulse depending upon the rate of variation of the waveform 40 between clock pulses. Thus, by applying the pulses of controlled width to the decoder 34, the inverter 19 can be operated to oppose the voltage change which otherwise would appear in the AC output, to thereby provide a pure, modulation free output.

Thus, in the design of the decoder 34, since, $$|Vo| = Vin|M| \tag{II}$$

where |Vo| is a matrix representing the output voltage, and |M| is a matrix representing a modulation factor introduced by the rectifier circuit 11, if decoder 34 is designed to produce a modulation function:

$$|M| = \left| \frac{\sin w_o t}{1 + 2 \sin w_i t} \right| \quad \text{(III)}$$

where $$2 = \frac{A_i}{V_{DC}} \quad \text{(IV)}$$

and $w_o$ is the fundamental frequency, then the harmonics cancel.

Figure 3:
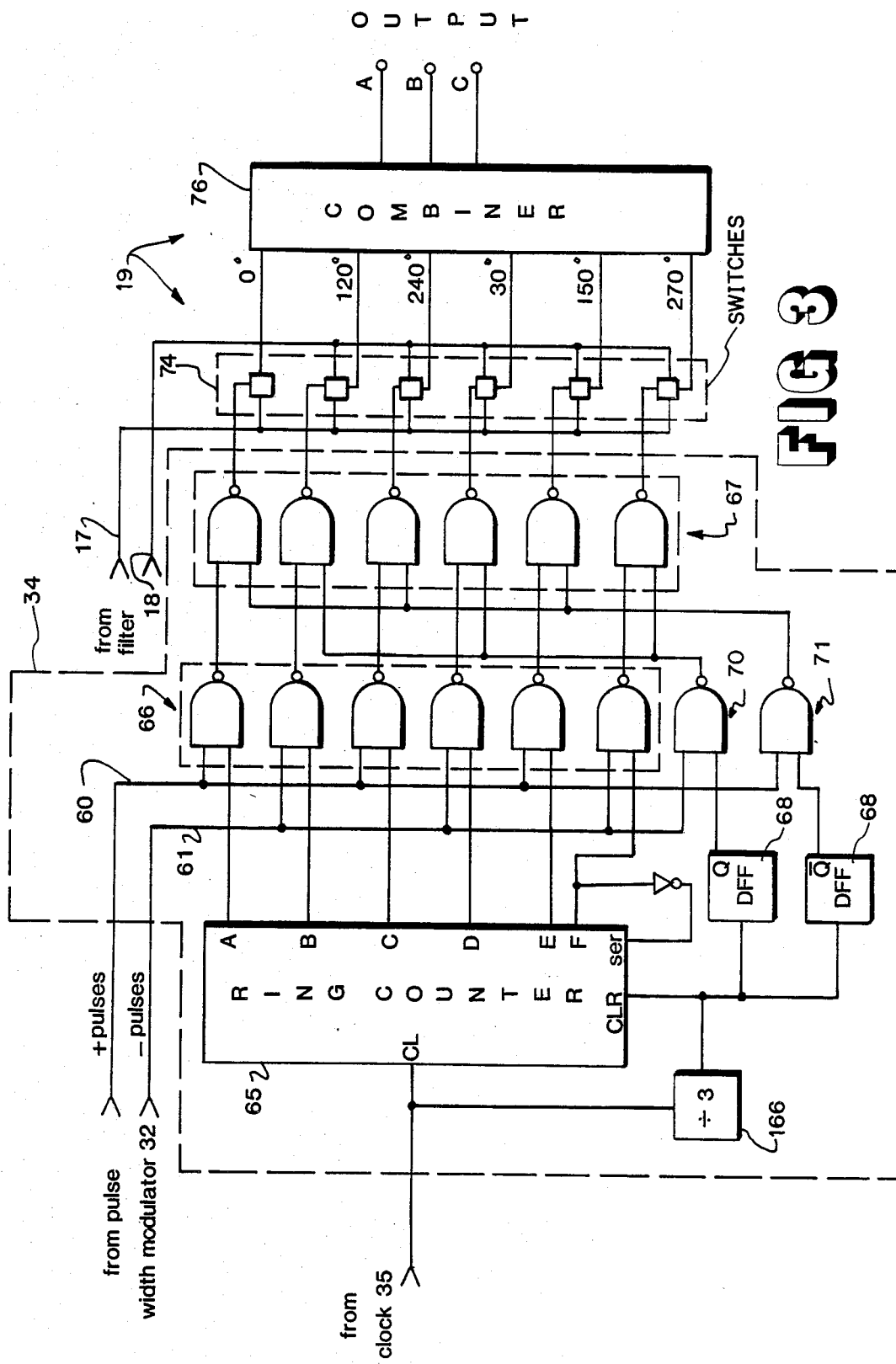
FIG. 3 is a schematic diagram of the decoder circuit depicted in FIG. 1 in combination with the inverter to which the decoded signals are applied to produce the desired power converter output signal.

With reference now to FIG. 3, a schematic diagram is shown illustrating one manner by which the decoder 34 and inverter 19 operation can be accomplished. The inputs to the decoder circuit 34 are seen to be the pulses from the clock 35 and the positive producing and negative producing pulse width modulated signals from the pulse width modulator 32 (on lines 60 and 61); and the input to the inverter 19 is from the output from the filter on lines 17 and 18. As noted, the frequency of the pulses from the clock 35, in a three phase system, can be six times the desired output frequency. The clock pulses are applied to clock ring counter 65 as well as to a divider 166 to divide the clock pulses by three. As mentioned, the frequency of the clock pulses is six times the desired output frequency, for a three phase system; thus, the output of the divide by three circuit 166 is clock pulses at twice the desired output frequency. The output pulses from the circuit 166 are applied to clear the ring counter each two cycles at the desired output frequency. The respective outputs from the ring counter 65 are applied to six NAND gates 66. Additionally, as shown, applied to every other one of the NAND gates 66 are the pulses from the respective positive and negative pulse producing lines 60 and 61 from the pulse width modulator 32. It can be seen that the phases of the respective outputs of the NAND gates 66 will be 0, 120, 240, 30, 150, and 270 degrees. The outputs from the NAND gates 66 are applied to a corresponding set of NAND gates 67, as shown. Additionally applied to the NAND gates 67 is selection logic derived from a pair of D type flip flops 68 together with the pulse width modulator outputs on lines 60 and 61 through respective NAND gates 70 and 71. The effect of the selection logic is to produce outputs on the respective alternating NAND gates in the set 67. The outputs from the NAND gates in the NAND gates set 67 are applied to a switching bank 74, which can conveniently be transistor switches, to switch between the positive and negative lines 17 and 18 from the filter to produce outputs delivered to a combiner 76 which selects the desired output signals for delivery to the output lines A, B and C from the overall conversion network.

Although the invention has been described and illustrated with a certain degree of particularity, it is understood that the present disclosure has been made by way of example only and that numerous changes in the combination and arrangement of parts may be resorted to by those skilled in the art without departing from the spirit and the scope of the invention as hereinafter claimed.

I claim:

1. A modulator control for an inverter having a rectified DC signal applied to its input, the modulator control comprising:

a high to low voltage transducer for producing a low voltage signal representation of said DC signal;

a leading phase shifter for shifting the phase of the said low voltage signal;

a sample and hold amplifier to which the said phase-shifted signal is applied;

a pulse generator for generating timing pulses applied to the sample and hold amplifier, whereby the sample and hold amplifier produces an output signal having an amplitude corresponding to the amplitude of the said phase-shifted signal during periods indicated by the pulse generator output;

a triangle wave generator for generating a triangle wave output signal;

a pulse width modulator for receiving the triangle wave output signal and the output signal from the sample and hold amplifier to produce output pulses indicative of the level of the said DC signal; and a decoder for receiving and decoding the output pulses from the pulse width modulator, the decoded pulses from the decoder being applied to the inverter to produce a three phase output therefrom having reduced amplitude modulation.

2. In a power conversion network having an inverter, a rectifier for rectifying a three phase AC input, and a filter comprising an inductor and capacitor for producing a filtered DC signal for application to the inverter, a modulator control for said inverter comprising:

a high to low voltage transducer for receiving the said filtered DC signal for producing a low voltage signal representation of said DC signal;

a leading phase shifter for shifting the phase of the said low voltage signal;

a sample and hold amplifier to which the said phase-shifted signal is applied;

a pulse generator for generating timing pulses applied to the sample and hold amplifier, whereby the sample and hold amplifier produces an output signal having an amplitude corresponding to the amplitude of the said phase-shifted signal during periods indicated by the pulse generator output; a triangle wave generator for generating a triangle wave output signal;

a pulse width modulator for receiving the triangle wave output signal and the output signal from the sample and hold amplifier to produce output pulses indicative of the level of the filtered DC signal; and a decoder for receiving and decoding the output pulses from the pulse width modulator, the decoded pulses from the decoder being applied to the inverter to produce a three phase output therefrom having reduced amplitude modulation.

\* \* \* \* \*